Aug. 27, 1963   J. C. WISE   3,101,591
VAPOR-GAS INJECTION THRUST VECTOR CONTROL SYSTEM
Filed March 28, 1961   2 Sheets-Sheet 2
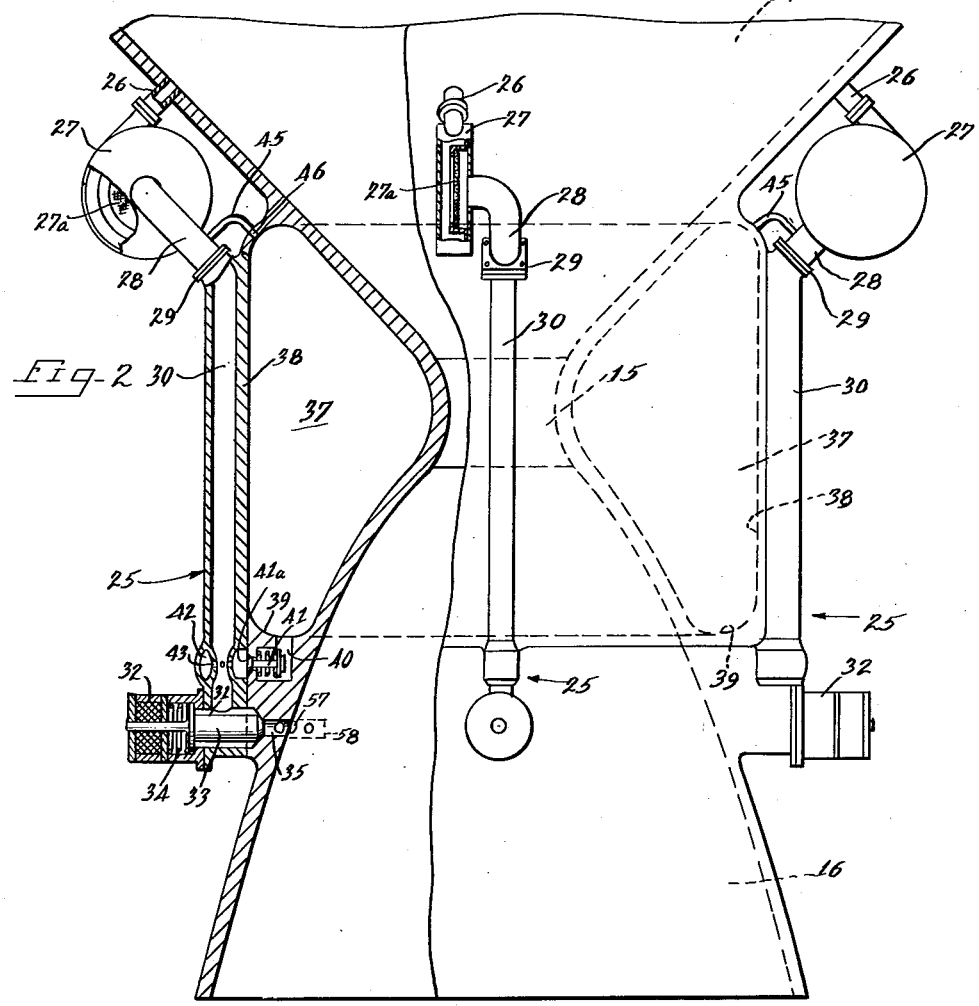
INVENTOR.
James C. Wise
BY
Hill, Sherman, Meroni, Gross & Simpson
ATTORNEYS //// # United States Patent Office 3,101,591
Patented Aug. 27, 1963

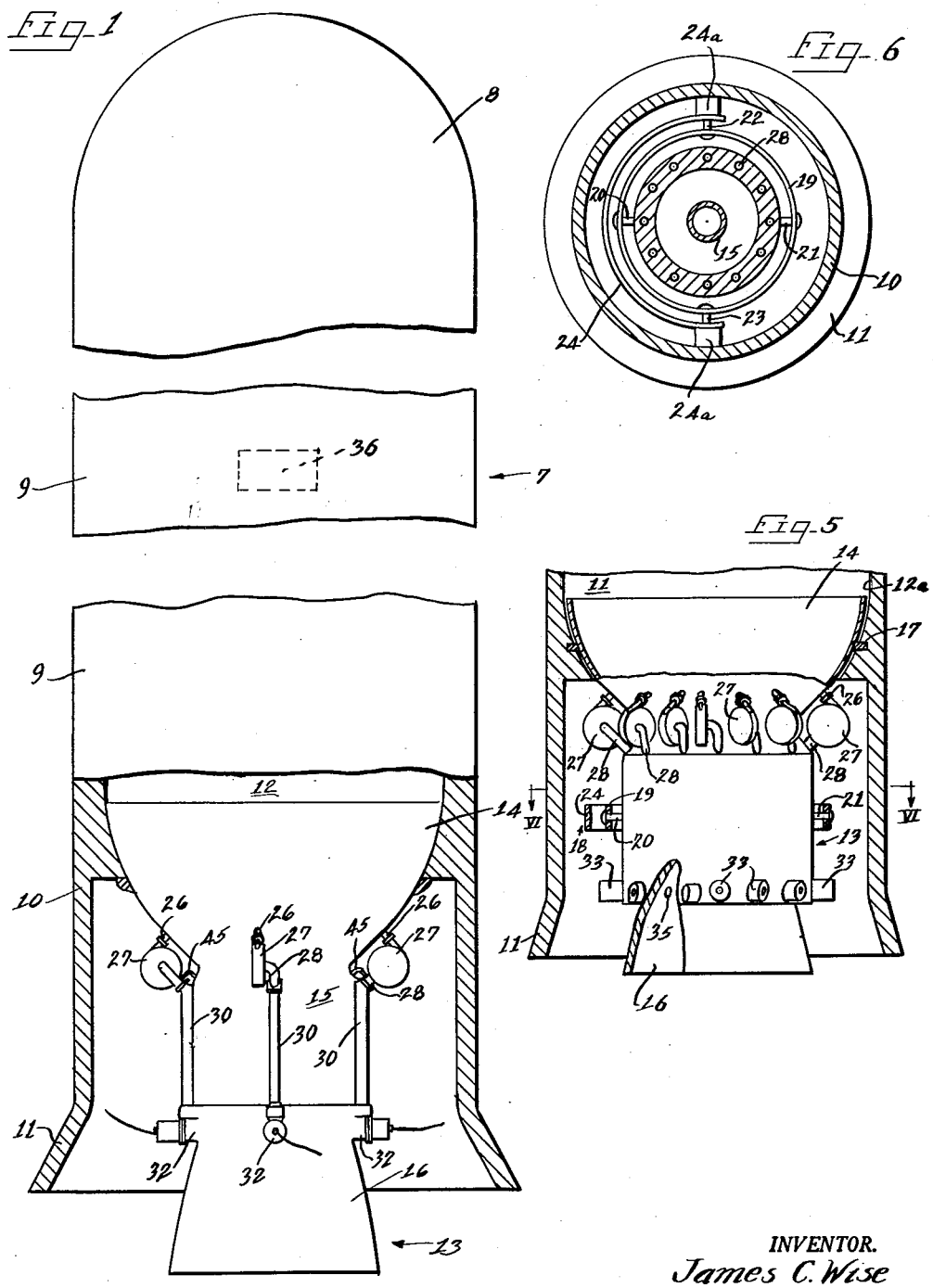

3,101,591
VAPOR-GAS INJECTION THRUST VECTOR CONTROL SYSTEM
James C. Wise, Pepper Pike Village, Ohio, assignor to Thompson Ramo Wooldridge Inc., Cleveland, Ohio, a corporation of Ohio
Filed Mar. 28, 1961, Ser. No. 98,902
5 Claims. (Cl. 60—35.54)

This invention relates to air and space borne vehicles, such as missiles, rockets, satellites, nose cones and the like, and is more particularly directed to improved methods and means for controlling the attitude of such a vehicle.

Heretofore, it has been customary to employ gimbaled nozzles and reaction motors, refractory vanes in the exhaust gas path from the reaction motor nozzle, and exterior vanes on the vehicle for controlling the attitude of the vehicle in the pitch, yaw and roll planes. These auxiliary components were quite complicated and increased the weight of the vehicle considerably.

Cooling of the exhaust nozzle also presented a problem. Heretofore such systems as circulating water through tubes formed in the nozzle, regenerative or otherwise, and circulation systems employing, in liquid mono- or bi-propellant systems, the fuel component as the coolant, were provided. These systems required complicated construction techniques in order to provide a nozzle having the required dimensions and the required conduit tubing therefor.

Because of the high temperature of the exhaust gases, materials of construction for the nozzle and associated components were normally constructed of exotic materials, such as fiber glass reinforced or asbestos reinforced phenolic resins. The complicated shapes and dimensions of components of a reaction motor constructed of these materials required the development of new methods of fabrication.

As far as I am aware, the exhaust gases flowing from a reaction motor through the exhaust nozzle thereof have never been employed because of the high temperature thereof, within the range of from about 3000° F. to about 7500° F. for attitude control.

With the present invention, I overcome the problems and difficulties of the prior art including elimination of the heretofore required attitude control components and utilize exhaust gases of reaction motors which are cooled to temperatures permitting employment of readily available materials and wherein the cooled exhaust gases are utilized to control the direction of thrust of the exhaust gases to thereby control the attitude of the air or space borne vehicle with which the present invention is employed.

It is therefore an object of the present invention to provide an improved attitude control system for air and space borne vehicles.

It is another object of the present invention to employ exhaust gases from the main reaction motor of an air or space borne vehicle for controlling the attitude of the vehicle.

Another object of the present invention is to provide means for cooling exhaust gases flowing from the exhaust nozzle of an air or space borne vehicle to temperatures permitting utilization of the cooled exhaust gases for controlling the attitude of the vehicle.

Another object of the present invention is to provide an improved cooling system for exhaust nozzles of reaction motors employed with air and space borne vehicles.

A still further object of the present invention is to provide means for controlling the attitude of an air or space borne vehicle wherein cooled exhaust gases are employed for gimbaling a nozzle in the pitch, yaw and roll planes.

A still further object of the present invention is to provide an attitude control system for an air or space borne vehicle including means for cooling the gimbaled exhaust nozzle of the main or primary reaction motor of the vehicle as well as cooling a portion of the exhaust gases for subsequent utilization thereof to control the thrust vector direction of the exhaust gases to thereby control the attitude of the vehicle.

Another object of the present invention is to provide improved methods for controlling the attitude of air and space borne vehicles.

These and other objects, features and advantages of the present invention will become more apparent from a careful consideration of the following detailed description, when considered in conjunction with the accompanying drawing, illustrating preferred embodiments of the present invention, and wherein like reference numerals and characters refer to like and corresponding parts throughout the several views.

On the drawings:

FIGURE 1 is a fragmentary view in partial section of an air or space borne vehicle constructed in accordance with the principles of the present invention.

FIGURE 2 is an enlarged fragmentary view in partial section of the nozzle of FIGURE 1 illustrating the details of the thrust vector control system.

FIGURE 3 is a generally schematic view illustrating the effect of the exhaust gases on thrust vector direction.

FIGURE 4 is an enlarged fragmentary view illustrating an ablation feature of the present invention.

FIGURE 5 is a fragmentary view in partial elevation of an alternative embodiment of the present invention.

FIGURE 6 is a view taken along lines VI—VI of FIGURE 5.

As shown on the drawings:

Briefly stated, the present invention involves by-passing a portion of exhaust gases emanating from a gimbaled exhaust nozzle communicating with a reaction motor of an air or space borne vehicle, filtering the exhaust gases to remove solid particles, by-passing a portion of the filtered gases for pressurizing a vaporizable fluid employed to cool a portion of the nozzle, flowing the main body of filtered gases past a valved manifold for mixing the main body of filtered exhaust gases with a portion of the pressurized coolant fluid passing through the manifold for vaporization thereof, and controlling flow of the mixture of gases through valve means having an outlet communicating with the interior of the exhaust nozzle downstream of the location where the exhaust gases were originally by-passed for creating a transverse shock wave in a desired direction to thereby change the direction of the exhaust gas thrust vector and thereby the attitude of the vehicle.

Although the present invention has a variety of applications, an embodiment thereof appears in FIGURE 1 wherein an air or space borne vehicle, generally indicated by the numeral 7 may include a conical front end 8, a fuselage or body portion 9 housing the guidance and associated components, not shown, and a rear end portion 10 which may be outwardly flaring as at 11.

Suitable reaction proportions of fuel and oxidizer components of the bi-propellant system, a monopropellant, a solid propellant, or a gel propellant may be supplied from an appropriate source, not shown, for reaction in a reaction chamber 12 shown in partial section and located in the end portion 10 of the vehicle.

The chamber 12 is formed integral with an exhaust nozzle of the De Laval type, generally indicated by the numeral 13, having an inlet portion 14, throat 15 and exit portion 16.

The exhaust nozzle 13, when formed integral with the reaction chamber 11 simplifies the construction and fabrication problems associated with the design of the overall vehicle. The requirements for close tolerance fits, expansion and contraction ratio determinations of materials of construction of separate nozzle and reaction chambers, of employment of bellows and other seals, gimbal mechanisms, and the like, may be substantially eliminated by employment of the attitude control system of the present invention. These design problems have currently caused considerable difficulty in establishing design standards, added to the weight of the vehicle, and required cowling apparatus presenting aerodynamic stability problems.

Heretofore, the auto pilot system of air and space borne vehicles controlled several servomechanisms which changed the orientation of gimbaled nozzles, reaction motors, jet vanes and the like for controlling the attitude of the vehicle.

By the application of a directional force to the reaction motor nozzle in accordance with this invention, the thrust vector direction of the nozzle exhaust gases may be changed to thereby control the attitude of the vehicle in both the pitch and yaw planes.

With my invention, exhaust gases flowing through the inlet portion 14 of the nozzle are employed for this purpose and mixed with a vaporizable liquid.

As appears in FIGURE 2, a plurality of exhaust gas thrust devices, generally indicated by the numeral 25 are shown located on the reaction motor nozzle. Four such devices 25 may be arranged around the nozzle and located 90° apart.

Each of said devices may include an apertured fitting 26 communicating the nozzle upstream of the throat 15 with a screening device 27 for filtering solid particles, such as aluminum particles employed in the fuel for promoting burning thereof. The housing 27 may be generally cylindrical in configuration and include a screen 27a separating the housing 27 into an inlet chamber and outlet chamber. The outlet chamber of the housing 27 communicates with a conduit 28 connected as at 29 to a main flow conduit 30 for the filtered exhaust gases. Conduit 30 terminates at its end opposite the conduit 28 in communication with a valve chamber 31 of a valve housing 32 normally closed by the valve 33. The valve 33 is normally closed and may be spring biased as at 34 to the closed position. The chamber 31 of the valve housing communicates with a passage 35 formed in the nozzle exit portion 16. Thus, means are provided for by-passing a portion of the exhaust gases from the reaction nozzle, filtering the exhaust gases, flowing the filtered exhaust gases under the control of a normally closed valve into the nozzle exit portion of the nozzle. The passage 35 is preferably formed in the nozzle in such a manner as to direct exhaust gases therefrom in a direction substantially transverse to the direction of flow of the exhaust gases emanating from the throat 15.

The valve 33 may be a solenoid valve operatively responsive for opening to a signal received from the auto pilot system 36 (FIGURE 1) of the vehicle with which the thrust control system is employed. It will be appreciated that each of the other thrust control devices 25 are identical in construction and operation to the structure above described.

The exhaust gases by-passed into fitting 26 are normally at a high temperature and means therefor are provided for cooling the exhaust gases prior to their introduction into the exit nozzle portion 16. For this purpose, a toroidal chamber 37 defined by an annular wall 38 and the nozzle wall may be provided. The chamber 37 may contain a vaporizable fluid, such as water, which is stable with respect to the exhaust gases. It will be appreciated that the fluid in the chamber 37 acts to cool the material of construction of the nozzle as well as cooling the conduit 30.

Chamber 37 communicates at its lower end 39 with a passage 40 having a normally closed spring biased valve 41 therein. The valve head 41a in the closed position prevents communication between passage 40 and an annular manifold 42 having passages 43 communicating with conduit 30 upstream of the valve chamber 31. Thus, if the fluid in chamber 37 were supplied under pressure of a level sufficient to open the normally closed valve 41 the fluid would pass through the apertures 43 from the manifold 42 and mixed with the exhaust gases flowing through the conduit 30 and be vaporized. In vaporizing, the mean temperature of the exhaust gases in conduit 30 would be reduced to a level sufficient to permit employment of readily available materials of construction for the valve assembly 33. The fluid in chamber 37 cools not only the exhaust nozzle but assists in reducing the temperature of the filtered exhaust gases in conduit 30. It will be appreciated that conduit 30 may be positioned in chamber 37, may be tortuous in configuration and that the particular construction thereof and of chamber 37 including the locations thereof are not critical except to the extent that the exhaust gases are mixed with the vaporizable liquid prior to introduction thereof into the passage 35.

The vaporizable fluid in chamber 37 is pressurized by by-passing a portion of the exhaust gases from conduit 28 through a conduit 45 communicating with an inlet 46 to the upper end of chamber 37.

First, as the exhaust gases flow through conduit 28, a portion thereof is by-passed for pressurizing the fluid in chamber 37 whereby the fluid acting on the valve 41 in passage 40, opens the valve and permits flow of fluid through manifold 42 and passages 43 for mixture with the main body of filtered exhaust gases. It will be noted that the passages 43 are preferably formed in a venturi throat section of the conduit 30. The venturi throat section is provided to create sufficient differential pressure in conduit 30 to cooperate in opening the spring loaded valve 41 to permit flow of the fluid from chamber 37. In addition, the venturi action assists in metering the fluid into conduit 30 in the proper amount to permit sufficient vaporization thereof.

During storage and handling, the inlet 46 and passage 40 may be sealed by burst or melting plugs (not shown).

The desired thrust vector control for the reaction nozzle is provided by positioning a number of the thrust control devices in the proper location to assure movement of the nozzle in the pitch and yaw planes.

It will be appreciated that the internal wall of the nozzle exit portion 16 will ablate and therefore the passage 35 will be reduced in dimension accordingly. If desired, an insert 50, as shown in FIGURE 4, may be seated in the nozzle exit portion 16 and bored to provide the passage 35. The insert 50 comprises a plurality of laminations 51 of wafer thickness bonded together by a low melting point adhesive 52. As the process of heat transfer from the exhaust gases to the nozzle continues, the melting temperature of the first adhesive joint 52 is reached, the refractory disk 51a is released and the localized exhaust gas pressure expels it through the nozzle outlet. Heat transfer proceeds through a plastic insulating wafer 53 and melts the low melting point adhesive 54 thereby unbonding the insulating wafer and next refractory wafer 51 which are also expelled through the nozzle. The adhesive melting temperature and insulating plastic material are chosen so as to duplicate the rate of regressive ablation of the rocket nozzle wall 16. Thus, both the throat and nozzle walls regress through ablation essentially together and no surface discontinuity is presented to the primary exhaust gas flow through the nozzle.

In operation, the auto pilot 36 energizes the solenoid of the valve 33 which moves the valve to the open position thereby permitting flow of the filtered exhaust gases through conduit 30 and passage 35. Flow through conduit 30 and passage 35 cooperates with the pressure head developed in chamber 37 to open valve 41 to permit flow of the vaporizable liquid into conduit 30 where it is vaporized for cooling the exhaust gases; the mixture of exhaust gases and vaporized fluid then flow parallel through passage 35 and into the exhaust nozzle exit portion 16. This flow of a mixture of exhaust gases and vaporized fluid creates oblique shock waves which act on the primary flow of exhaust gases through the nozzle exit portion 16 thus changing the direction of flow of the primary exhaust gases and thereby producing a corresponding change in the thrust vector direction of the exhaust gases (FIGURE 4). Change in the thrust vector direction of the exhaust gases will cause a corresponding change in the direction of movement of the vehicle. It will be appreciated that a gimbal arrangement 18 need not be employed and that the reaction motor and exhaust gas nozzle may be formed integral since the valve 33 may be modulated to control the rate of flow of the mixture of cooled exhaust gases and vaporized fluid and thereby the magnitude of the shock waves established in the nozzle exit portion 16 to thereby control vehicle orientation only by the changes in thrust vector direction.

Passage 35, of course, may communicate with a plurality of outlets 57 and 58 through a manifold to thereby provide a uniform application of shock waves to the primary exhaust gas flow.

It will be appreciated that the control device 36 will actuate the proper valve 33 and thus the proper thrust control device 25 for changing thrust vector direction to produce the desired movement of the vehicle in the pitch and yaw planes. Similarly, the control unit 36 may position the valve 33 to vary the injection rate of the mixture of exhaust gases and vaporized fluid and thereby the magnitude of the shock waves induced in the primary exhaust gas flow through the nozzle.

If desired, the thrust control device 25 may be employed for cooling exhaust gases used subsequently for operation of auxiliary components, such as turbines, employed to operate the fuel supply pumps.

As appears in FIGURE 5, a plurality of thrust control devices 25 may be annularly arranged around a nozzle and the control valves 33 thereof connected to the control unit 36 for selective actuation thereof to thereby control the magnitude and direction of the exhaust gas thrust vector. It will be noted that the arrangement shown in FIGURE 6 includes a nozzle 13 having internally formed passages or conduits 30.

The nozzle entrance portion 14 is sized to the wall 12a of the reaction chamber 11 to provide a ball and socket joint thereby permitting swiveling or gimbal movement of the nozzle 13. An annular seal 17 may be provided to prevent gas leakage between the nozzle and reaction chamber wall 12a.

The exhaust nozzle 13 is of the De Laval type and may be secured in a gimbal arrangement 18 which clearly appears in FIGURE 5. The gimbal arrangement 18 includes an annular ring 19 pinned as at 20 and 21 to the nozzle 13 at an appropriate location, such as the throat 15 thereof, for movement of the nozzle in the pitch plane which is the vertical plane as appears in FIGURE 5. The ring 19 is pinned as at 22 and 23 for oscillation in a semi-circular ring 24 which is secured as at 24a to the wall of the nozzle exit portion 10. Ring 24 permits movement of the nozzle in the yaw plane.

Thus, by the application of a directional force to the reaction motor nozzle, the thrust vector direction of nozzle exhaust gases may be changed to thereby control the attitude of the vehicle in both the pitch and yaw planes.

Thus, it will be appreciated that with my invention I provide improved means for attitude control of air and space borne vehicles by employing cooled reaction chamber exhaust gases, provide improved means for cooling exhaust gases to temperatures within limits permitting employment of readily available materials, and cooling of a gas discharge nozzle.

Although minor modifications of the present invention will become apparent to those versed in the art, it is to be understood that I wish to embody within the scope of the patent warranted hereon all such embodiments as reasonably and properly come within the scope of my contribution to the art.

I claim as my invention:

1. A system adapted to control the attitude of air and space borne vehicles propelled by the thrust produced by exhaust gases generating in a reaction motor and discharging through a gas discharge nozzle having a nozzle throat comprising: an outlet port formed in the nozzle entrance portion for receiving a portion of the hot exhaust gases from the reaction motor, an inlet passage formed in the nozzle wall downstream of the outlet port and downstream of the nozzle throat, first conduit means communicating the outlet port and the inlet passage for delivering exhaust gases to the inlet passage, first valve means for modulating flow through said inlet passage, a housing containing a vaporizable cooling fluid, second conduit means for bypassing a portion of the exhaust gases from the first conduit means for pressurizing the cooling fluid, passage means communicating the first conduit means and the cooling fluid housing, and second valve means normally closing said first conduit means and operatively responsive for opening to the pressure of the bypassed exhaust gases to thereby deliver the cooling fluid for mixture with the exhaust gases to form a cooled mixture of exhaust gases and vaporized fluid that is delivered through the inlet passage into the interior of the gas discharge nozzle in an oblique impinging stream on the primary body of exhaust gases flowing through the nozzle to thereby control the attitude of the vehicle.

2. A system adapted to control the attitude of air and space borne vehicles propelled by the thrust produced by exhaust gases generated in a reaction motor and discharging through a gas discharge nozzle having a nozzle throat comprising: an outlet port formed in the nozzle entrance portion for receiving a portion of the hot exhaust gases from the reaction motor, conduit means connecting the outlet port with a filter device for filtering solid particles from the hot exhaust gases, a housing containing a vaporizable cooling fluid, first conduit means for bypassing a portion of exhaust gases from the filter device for pressurizing the cooling fluid, an inlet passage formed in the nozzle wall downstream of the outlet port and downstream of the nozzle throat, first valve means for modulating flow through the inlet passage, second conduit means communicating the filter device and first valve means for delivering filtered gases to the first valve means, passage means communicating the second conduit means and the cooling fluid housing, and second valve means normally closing said second conduit means and operatively responsive for opening to the pressure of the bypassed exhaust gases to thereby deliver the cooling fluid for mixture with the filtered exhaust gases to form a cooled mixture of exhaust gases and vaporized fluid that is delivered through the inlet passage into the interior of the gas discharge nozzle in an oblique impinging stream on the primary body of exhaust gases flowing through the nozzle to thereby control the attitude of the vehicle.

3. A system adapted to control the attitude of air and space borne vehicles propelled by the thrust produced by exhaust gases generated in a reaction motor and discharging through a gas discharge nozzle having a nozzle throat comprising: an outlet port formed in the nozzle entrance portion for receiving a portion of the hot exhaust gases from the reaction motor, conduit means connecting the outlet port with a filter device for filtering solid particles from the hot exhaust gases, an annular housing surrounding the nozzle containing a vaporizable cooling fluid, first conduit means for by-passing a portion of the exhaust gases from the filter device for pressurizing the cooling fluid, an inlet passage formed in the nozzle wall downstream of the outlet port and downstream of the nozzle throat, first valve means for modulating flow through the inlet passage, second conduit means communicating the filter device and first valve means for delivering filtered gases to the first valve means, passage means communicating the second conduit means and the cooling fluid housing, and second valve means normally closing said second conduit means and operatively responsive for opening to the pressure of the by-passed exhaust gases to thereby deliver the cooling fluid for mixture with the filtered exhaust gases to form a cooled mixture of exhaust gases and vaporized fluid that is delivered through the inlet passage into the interior of the gas discharge nozzle in an oblique impinging stream on the primary body of exhaust gases flowing through the nozzle to thereby control the attitude of the vehicle.

4. A system adapted to control the attitude of air and space borne vehicles in the pitch and yaw planes, said vehicles being propelled by the thrust produced by exhaust gases generated in a reaction motor and discharging through a gas discharge nozzle having a nozzle throat, comprising: a plurality of outlet ports formed in the nozzle entrance portion for receiving a portion of the hot exhaust gases from the reaction motor, conduit means connecting the outlet ports with a filter device for filtering solid particles from the hot exhaust gases, a housing containing a vaporizable cooling fluid, first conduit means for by-passing a portion of the exhaust gases from the filter device for pressurizing the cooling fluid, a plurality of inlet passages formed in the nozzle wall downstream of the outlet ports and downstream of the nozzle throat, valve means for modulating flow through the inlet passages, second conduit means communicating the filter device and first valve means for delivering filtered gases to the first valve means, passage means communicating the second conduit means and the cooling fluid housing, and second valve means normally closing said second conduit means and operatively responsive for opening to the pressure of the by-passed exhaust gases to thereby deliver the cooling fluid for mixture with the filtered exhaust gases to form a cooled mixture of exhaust gases and vaporized fluid that is delivered through the inlet passage into the interior of the gas discharge nozzle in an oblique impinging stream on the primary body of exhaust gases flowing through the nozzle to thereby control the attitude of the vehicle.

5. A system adapted to control the attitude of air and space borne vehicles, said vehicles being propelled by the thrust produced by exhaust gases generated in a reaction motor and discharging through a gas discharge nozzle, having a nozzle throat, comprising: an outlet port formed in the nozzle entrance portion for receiving a portion of the hot exhaust gases from the reaction motor, conduit means connecting the outlet port with a filter device for filtering solid particles from the hot exhaust gases, a housing containing a vaporizable cooling fluid, first conduit means for by-passing a portion of the exhaust gases from the filter device for pressurizing the cooling fluid, an inlet passage formed in the nozzle wall downstream of the outlet port and downstream of the nozzle throat, first valve means for modulating flow through the inlet passage, second conduit means communicating the filter housing and first valve means for delivering filtered gases to the first valve means, a manifold communicating the second conduit means and the cooling fluid housing, ports communicating the manifold and cooling fluid housing, and second valve means normally closing said second conduit means and operatively responsive for opening to the pressure of the by-passed exhaust gases to thereby deliver the cooling fluid through said second valve means for mixture with the filtered exhaust gases, to form a cooled mixture of exhaust gases and vaporized fluid that is delivered through the inlet passage into the interior of the gas discharge nozzle in an oblique impinging stream on the primary body of exhaust gases flowing through the nozzle to thereby control the attitude of the vehicle.

References Cited in the file of this patent

UNITED STATES PATENTS

| 2,260,893 | Holt et al. | Dec. 9, 1952 |
| 2,850,977 | Pollak | Sept. 9, 1958 |
| 2,875,578 | Kadosch et al. | Mar. 3, 1959 |
| 2,916,873 | Walker | Dec. 15, 1959 |
| 2,919,546 | David | Jan. 5, 1960 |
| 2,932,157 | Villasenor | Apr. 12, 1960 |
| 2,943,821 | Wetherbee | July 5, 1960 |
| 3,020,709 | Bertin et al. | Feb. 13, 1962 |

FOREIGN PATENTS

| 1,057,271 | France | Oct. 28, 1953 |
| 1,197,701 | France | June 8, 1959 |
| 636,045 | Germany | Sept. 10, 1936 |